No. 651,038. Patented June 5, 1900.
R. F. HEROLD & E. F. HAAS.
CARBONATING BEVERAGES.
(Application filed Dec. 13, 1897.)
(No Model.)
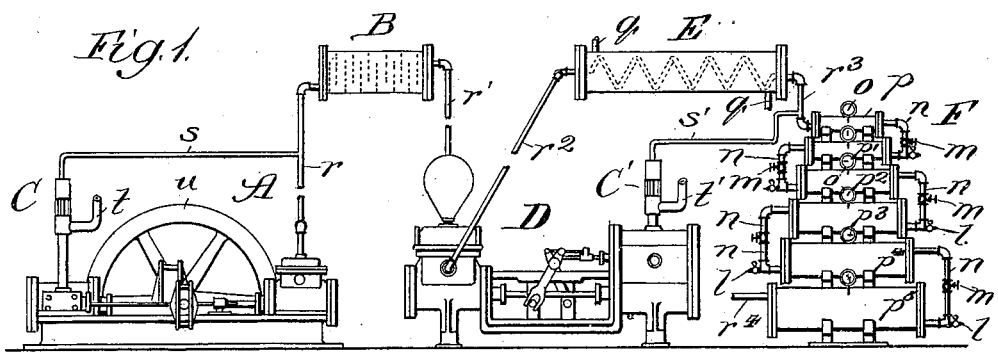
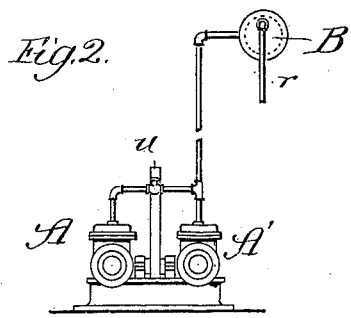
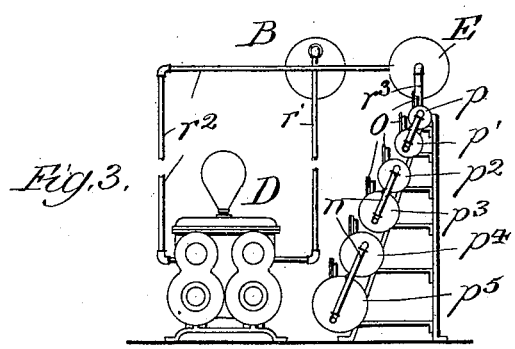
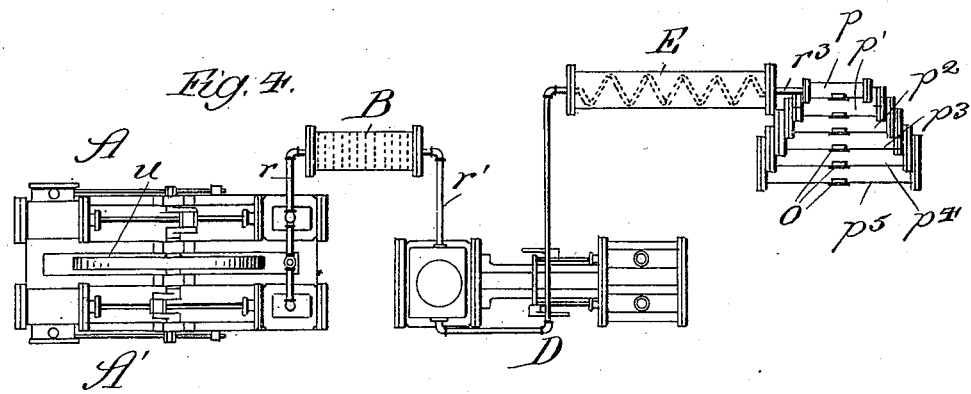
WITNESSES:
Dan. W. Lee
Richard T. Spencer
INVENTORS
Robert F. Herold,
Emil F. Haas
BY
Dyrenforth & Dyrenforth,
ATTORNEY

UNITED STATES PATENT OFFICE.

ROBERT F. HEROLD AND EMIL F. HAAS, OF ST. LOUIS, MISSOURI.

CARBONATING BEVERAGES.

SPECIFICATION forming part of Letters Patent No. 651,038, dated June 5, 1900.

Application filed December 13, 1897. Serial No. 661,678. (No specimens.)

*To all whom it may concern:*

Be it known that we, ROBERT F. HEROLD, a citizen of the United States, and EMIL F. HAAS, a subject of the Emperor of Germany, both residing at St. Louis, in the State of Missouri, have invented a new and useful Improvement in Carbonating Beverages, of which the following is a specification.

Our invention relates particularly to the preparation of malt beverages for the market; and our object is to obtain by suitable mechanical agencies a proper impregnation of such beverages with carbonic-acid gas.

In the art of brewing as it has been practiced in the past two general methods of impregnation have been employed. The first may be termed "natural charging," and it consists in causing the beer to become impregnated to the required degree with self-generated carbonic-acid gas, either by bunging the vessel for a sufficient time before fermentation has subsided or by exciting by means of a fermentative substance, such as kraeusen, a new fermentation in the beer and permitting the surplus gas to escape. The second general method may be termed "artificial charging," and it consists in mixing carbonic-acid gas with the beer by mechanical means until the beer has become charged to the required degree. This is effected by the various so-called "carbonators" which are in use in breweries at the present time.

The purpose of carbonating beer is to improve it, both in appearance, by giving it a sparkling and effervescent property, and in palatability, by imparting to it the peculiar taste which results from the presence of carbonic-acid gas in solution, and these effects follow both from natural and artificial impregnation. There is, however, a difference which is material and which is fully recognized, both by persons skilled in the art of brewing and by consumers, between beer which has been naturally impregnated and beer which has been artificially impregnated with carbonic-acid gas, this difference being most conspicuous in the degree of intimacy of association subsisting between the beer and the contained carbonic-acid gas. Heretofore this intimacy of association has been far greater in the case of beer naturally impregnated than in beer artificially impregnated, so that the former has always retained its foam much better than the latter when exposed to the atmosphere. Foam consists of minute cells, formed of the viscid constituents of beer, each of which is inflated by carbonic-acid gas, and the more minute the particles of the carbonic-acid gas become by distribution through the liquid the denser and more lasting is the foam upon the beer and the more agreeable is the taste to the consumer. Heretofore it has never been found possible by artificial charging to attain the extent of distribution and the intimacy of association between the carbonic-acid gas and the beverage which follow from natural impregnation, and the result has been that artificial charging, though having great advantages in point of convenience and economy, has always been recognized as inferior to the other in its results. Efforts have been made heretofore, with more or less success, in the direction of enhancing the distribution and intimacy of molecular association by subjecting the beer after a preliminary incorporation of the gas to mechanical pressure as high in some cases as one hundred and fifty pounds to the square inch, or even more, and applied usually in the form of a sudden impact or concussion. This was an effort in the right direction; but it has proved by no means effectual for bringing artificially-charged beer up to the standard established by beer naturally charged.

The object of our invention is so to charge the beer by artificial or mechanical agencies as to cause the degree of distribution of the gas and the intimacy of molecular association between the gas and the beer to be substantially the same as in beer charged naturally; and it consists, broadly, in subjecting the beverage, after it has been charged by any suitable agencies with the required quantity of carbonic-acid gas, to a degree of mechanical compression sufficient to liquefy free carbonic-acid gas at the subsisting temperature and thereafter reducing the pressure to the normal pressure. We have found that the effect of this treatment is to cause the same intimate association between the gas and the beverage as exists when natural impregnation is employed, and we thus overcome all the objections which have heretofore attached to artificial charging.

We have practiced our invention successfully by means of the apparatus illustrated in the accompanying drawings, in which—

Figure 1 is a side elevation of the apparatus; Fig. 2, an end view of the initial pump and mixing-cylinder detached; Fig. 3, an end view of the compression-pump, cooler, and pressure-reducer detached, and Fig. 4 a plan view of the device as illustrated in Fig. 1.

Our process may be practiced, however, by the employment of mechanical agencies differing materially from those illustrated, and we therefore do not limit ourselves to any particular form of device, provided it is capable of carrying out our process.

Referring to the drawings, A A' are two force-pumps, the pump A communicating with the gas-supply and the pump A' with the beer-supply by the usual connections, which are not shown, by which the beer and carbonic-acid gas, properly proportioned, as in the case of artificial charging generally, are conveyed to the mixer B under a forcing pressure of about forty pounds to the square inch. Between the gas-pump and beer-pump is a check-valve $u$ in the discharge-pipe, which prevents any beer from entering the gas-pump. The pressure is maintained uniform by means of the regulator C, connected to the steam-inlet pipe $t$ and also connected by means of a pipe $s$ with the pipe $r$, through which the beer and gas flow to the mixer B.

D is a duplex compression-pump connected by a pipe $r'$ with the mixer B.

E is a cooler connected to the discharge side of the pump D by a pipe $r^2$, and F is a pressure-reducing device communicating with the cooler E through a pipe $r^3$. The cooler E is provided with an inlet $q$ and an outlet $q'$ for brine, and the pipe $r^3$ communicates with the steam-inlet pipe $t'$ of the pump D through the medium of a pipe $s'$ and a regulating-valve C', similar to that employed in connection with the pump A. The pressure-reducer F consists of a series of cylinders $p$, $p'$, $p^2$, $p^3$, $p^4$, and $p^5$, each provided with a pressure-gage $o$ and each communicating with a cylinder below it through a pipe $n$, provided with a valve $m$. A drainage-cock $l$ is provided at the lower end of each connecting-pipe $n$. From the final cylinder $p^5$ the beer passes, by way of the pipe $r^4$, to a storage vessel, which receives it against a counter-pressure, or to the racker, if it is desired to rack directly from the pressure-reducer.

The pipe $r^3$ may enter the under side of the cylinder $p$, if desired, instead of the end, and the first pipe $n$ connects the upper side of the cylinder $p$ with the under side of the cylinder $p'$, and so on throughout the series. This latter construction has certain advantages in the matter of the removal of the heads for cleansing purposes, but is not essential to the successful working of the apparatus.

The operation is as follows: The pumps having been set in motion, beer and gas, under a pressure of about forty pounds, pass to the mixer B, thence to the compression-pump D, thence to the cooler E, and thence to the pressure-reducer. The several valves $m$ in the pressure-reducer are all open, and the uppermost valve in the pipe leading from the cylinder $p$ to the cylinder $p'$ is gradually closed by hand until the uppermost pressure-gage $o$ shows the required pressure. Carbonic-acid gas at a temperature of 32° Fahrenheit liquefies at a pressure of about five hundred and twenty-nine and one-half pounds to the square inch. Therefore it is essential at the temperature named that the uppermost pressure-gage should indicate a pressure not less than five hundred and twenty-nine and one-half pounds to the square inch, and it may be considerably higher. The reduction of pressure in its progress through the pressure-reducer is effected by a regulation of the successive valves, each being opened to a greater extent than the one preceding, the graduated size of the cylinders being mainly for the purpose of causing uniformity and regularity in the flow. The preliminary pumps A A' might be operated at any pressure which would convey the beer and gas to the mixer B; but we prefer to employ a pressure as high as forty pounds to the square inch for the beer-pump and somewhat more for the gas-pump, since this relieves the strain upon the duplex pump D. The cooler E has been found advantageous, but is not indispensable, and it may be of any form desired. Moreover, additional or other coolers may be employed wherever they may be found advantageous. The function of the regulating devices C and C' is to maintain uniformity of pressure by regulating the supply of steam to the steam-cylinder in proportion to the resistance. Obviously the degree of pressure indicated by the uppermost pressure-gage $o$ must be governed according to the temperature subsisting in the beer. If this is somewhat higher than 32° Fahrenheit, the pressure must be increased, and if it is somewhat lower than 32° Fahrenheit the pressure may be correspondingly diminished.

As a rule we pass the beer through a filter before it enters the pump A', which has the advantage of clarifying it while it is in a still condition. If desired, however, the filtration may take place after the beer leaves the pressure-reducer or at any convenient intermediate point.

What we claim as new, and desire to secure by Letters Patent, is—

1. As a step in the preparation of malt beverages for the market, subjecting the beverage, previously impregnated with carbonic-acid gas, to a pressure sufficient to liquefy free carbonic-acid gas at the subsisting temperature, substantially as described.

2. The process of preparing malt beverages for the market, which consists in charging the beverage with the required quantity of carbonic-acid gas, then subjecting the charged beverage to a pressure sufficient to liquefy free carbonic-acid gas at the subsisting temperature, and thereupon reducing the pressure to the desired degree, substantially as described.

3. The method of carbonating beverages, which consists in charging the beverage with carbonic-acid gas, then subjecting the charged beverage to a pressure sufficient to liquefy free carbonic-acid gas at the subsisting temperature, then cooling the beverage to abstract the heat of compression, and finally reducing the pressure by graduated stages to the desired ultimate pressure, substantially as described.

4. The method of preparing malt beverages for the market, which consists in charging the beverage under adequate pressure with carbonic-acid gas to the degree required in the finished product, then subjecting the beverage so charged to a pressure sufficient to liquefy free carbonic-acid gas at the subsisting temperature, cooling the charged beverage as required to abstract the heat of compression, and finally reducing the pressure by graduated stages to the desired ultimate pressure, substantially as described.

ROBERT F. HEROLD.
EMIL F. HAAS.

In presence of—
M. J. FROST,
R. T. SPENCER.